Figure 1:
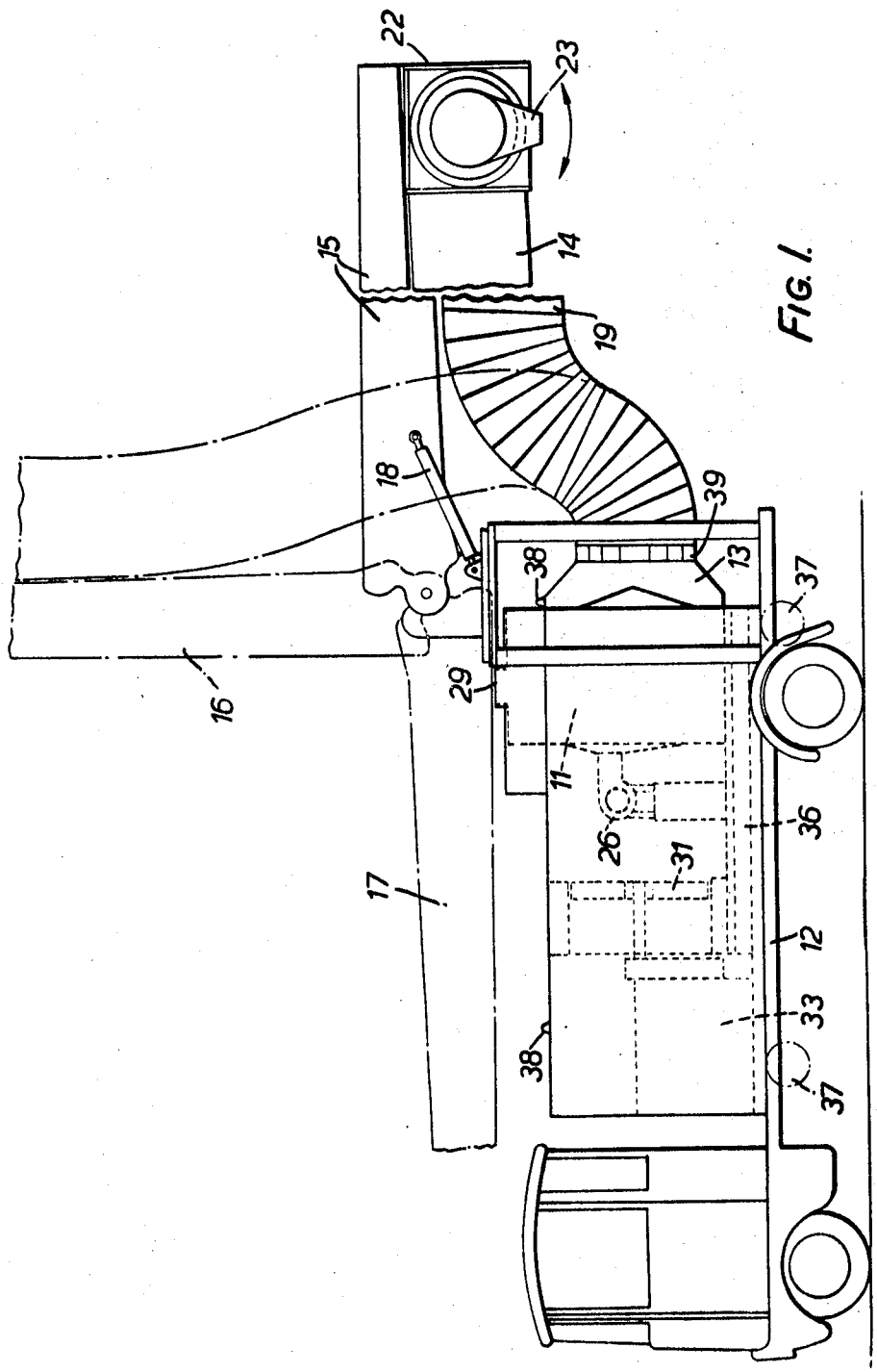

United States Patent

[11] 3,602,211

[72] Inventor Walter Herbert Nelson Charman
"Westleigh,"Furzehill, Wimborne, England
[21] Appl. No. 861,442
[22] Filed Sept. 26, 1969
[45] Patented Aug. 31, 1971

[54] HOT AIR GENERATOR UNIT
9 Claims, 3 Drawing Figs.
[52] U.S. Cl. .................................................. 126/271.2
R, 126/110 B
[51] Int. Cl. ...................................................... F24h 3/02
[50] Field of Search .......................................... 126/271.2,
271.2 A, 271.2 C, 110 B

[56] References Cited
UNITED STATES PATENTS
864,062 8/1907 Ballintine ..................... 126/271.2 A

| | | | |
|---|---|---|---|
| 1,515,476 | 11/1924 | Greenfield.................. | 126/271.2 C |
| 2,336,609 | 12/1943 | Herbster..................... | 126/110 B |
| 2,532,994 | 12/1950 | Chausse ..................... | 126/271.2 C |
| 2,620,787 | 12/1952 | Zink............................ | 126/110 B |
| 3,410,262 | 11/1968 | Qualls ........................ | 126/271.2 |

Primary Examiner—Charles J. Myhre
Attorney—Watson, Cole, Grindle & Watson

ABSTRACT: The invention is a portable generator of vast quantities of hot air for industrial processes or for deicing aircraft surfaces. The complete unit on wheels or on a lorry has a heat-exchanger, an engine driven air fan and a burner using fuel oil from a tank in the unit, and the hot air output can be directed at a surface to be treated.

INVENTOR
WALTER H. N. CHARMAN
BY
Watson, Cole, Grindle & Watson
ATTORNEYS

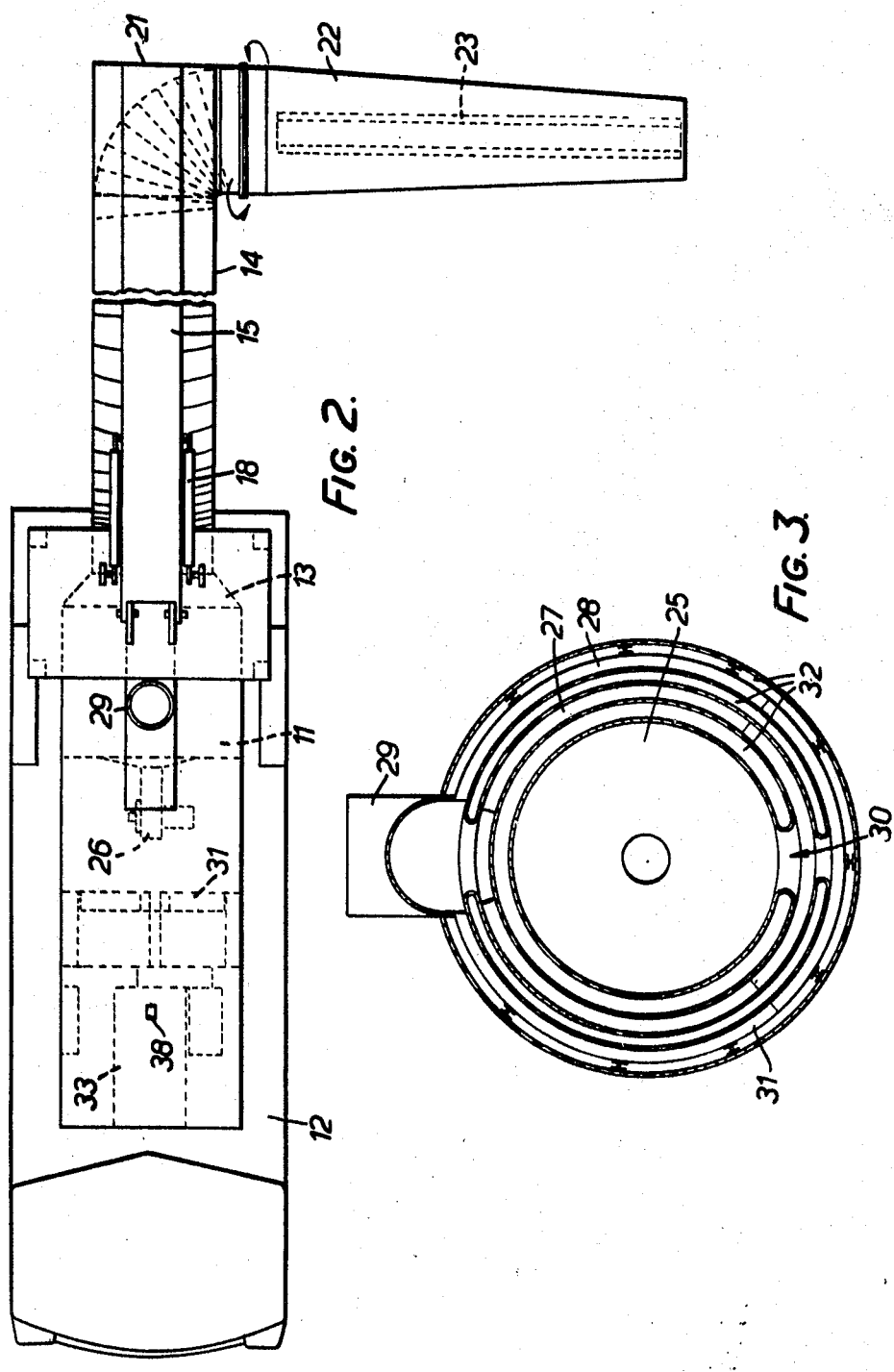

HOT AIR GENERATOR UNIT

This invention relates to a mobile hot air generator unit, and one object is to provide such a unit, which is adapted for providing very large quantities of heat in exposed areas or other areas where heating is difficult. For example a rate of heat generator of 1 million B.t.u. per hour in 25,000 cubic feet of air per minute might be provided.

According to the present invention, a mobile hot air generator unit includes a heat exchanger for heating air delivered by an engine driven pump or fan to a discharge opening by use of the products of combustion from a fuel burning heater burning fuel from a tank in the unit.

The unit may be mobile by reason of being mounted on wheels, or having hooks for crane attachment or both, or for some applications may be mounted on a lorry, and then the lorry engine can be used for driving the air pump, or a fuel pump, or both. When the unit is not mounted on a lorry separate air and fuel pump driving engines or motors would be provided.

Preferably, the heat exchanger is of the separated kind, in which the products of combustion always are separated from the air to be heated by a heat exchange wall. In one form of the invention, the heat exchanger is generally of annular form with the air passages and the passages for the products of combustion arranged with one surrounding the other. Then the direction of air discharge could be axial, while the direction of flow of the products of combustion to a chimney could be generally vertical but around annular passages at right angles to the direction of flow of the air.

The heated air can be led to a suitably shaped discharge opening, so that the unit as a whole is capable of being positioned to direct the air as required, and this might be quite satisfactory for heating a factory space, or heating a large body, such as the hull of a ship, which might be required to be heated for working on or for deicing, or for preparation for some mechanical process. However, for some applications where directed discharge of hot air is required over a local surface, it is preferred that the discharge opening leads to a flexible pipe, leading in turn to an appropriate nozzle.

In one application, suitable for deicing aircraft surfaces on the ground, such a flexible pipe can extend for 25 feet from the discharge from the heat exchanger, and carries a swingable member in the form of an outlet box having sides defining a nozzle 10 feet long by 6 inches wide, so that a large area of the aircraft surface can be deiced by application of hot air.

This application is suitable for mounting the whole of the unit on a lorry, which may then also have a jib for moving the duct and nozzle appropriately under the control of the operator. The jib could be hydraulically or otherwise operated, using power from the engine of the vehicle, and could be stowed in a fore and aft direction over the hot air generator when not in use, possibly after the duct has been disconnected from the discharge opening.

This type of equipment enables great amounts of heat to be generated, for example, a 350 gallon fuel tank would allow operation for 10 hours, producing 5,000,000 B.t.u. per hour in 2,500,000 cu. ft. of air, delivered by an axial fan 4 feet in diameter, driven by a 54 h.p. engine which might be the lorry engine. The whole equipment in one form weighs 2 tons.

It will be appreciated that a mobile unit for producing hot air at this rate is quite distinct from a small portable hot air generator, such as might be used for hair drying in that it enables many industrial processes to be performed, and according to an aspect of the invention, a hot air generator unit as defined is used in an industrial process, for example, for curing thermosetting plastics materials, for drying articles, for deicing or defrosting aircraft surfaces, heating or otherwise treating ship's hulls, for heating the air in a factory, hanger, or other industrial area, and so on.

The invention may be carried into practice in various ways, and one embodiment will be described by way of example, with reference to the accompanying drawings, of which:

FIG. 1 is an elevation of a portable unit embodying the invention, mounted on a lorry, FIG. 2 is a plan view corresponding to FIG. 1, and FIG. 3 is a diagrammatic section of the heat exchanger.

The heater or heat generator 11 is mounted on a lorry 12, with a discharge opening 13 at the rear. The discharge opening 13 can be connected to a duct 14 about 25 feet long and 3 feet in diameter, supported by a jib 15 which is capable of being elevated vertically as shown at 16, or completely through 180° to be stowed directly forwardly over the heater as shown at 17. The jib can be operated by hydraulic jacks, one of which is shown generally at 18, and which can use fluid pumped by the lorry engine. The inlet end of the duct 14, which is reinforced with a wire coil 19, can be removed from the discharge opening 13 when the jib is to be elevated and stowed.

At the rear end the jib carries through a flexible joint 21 an outlet 22, consisting of a boxlike framework covered in except for an elongated nozzle 23 in the underside, 10 feet long and 6 inches wide.

This particular heater is designed for deicing aircraft on the ground, and even while the passengers are disembarking the lorry can be driven adjacent the aircraft and the jib can be used to direct the nozzle 23 over different surfaces of the aircraft, and the vast quantity of heated air can quickly remove ice. Operation of the jib together with the flexible joints enables tail planes, fuselage wings, and so on, to be effectively heated in turn.

The heater unit itself embodies a heat exchanger, shown generally in FIG. 3, having a central cylinder 25 for receiving products of combustion from a paraffin burner 26. The products of combustion are driven through a lower neck 30 into annular passages 27 and 28, which are generally of constant section throughout the length of the heat exchanger, and eventually the products of combustion rise to the top of the heater, where they are led away through a chimney 29.

The air to be heated is driven axially through passages 32, annularly interleaved between the hot air regions 25, 27 and 28, rearwardly to the discharge opening 13. The air is driven by a 4 feet diameter axial fan 31 driven by a 54 hp. diesel engine 33. The lorry also carries a 350 gallon fuel tank 36.

The unit is capable of delivering 5,000,000 B.t.u. per hour in 2,500,000 cu.ft. of air, and because the combustion products and the heated air are completely separated from one another, the air is quite clean and could be filtered if necessary for use in industrial applications where clean air is essential.

There may also be an operator's platform (not shown) suitably positioned to enable him to control movement of the jib and the nozzle 23.

In another application of the invention, the heater unit 11, 13 26, 31 and 33, is not mounted on a lorry but on its own wheels 37 (shown in chain lines), so that it can be moved into an appropriate position in a factory, and has lugs 38 for being lifted by a crane for example to a position adjacent the hull or in the hold of a ship which may have to be heated, either to enable the workers to work during the winter, or for providing heat treatment to the hull itself.

Then the duct 14 will not be used, but the discharge opening 13 will be controlled by adjustable louvres 39.

What we claim as our invention and desire to secure by Letters Patents is:

1. A mobile clean hot air generator including a fuel-burning heater, a heat exchanger comprising a central chamber for the products of combustion and having an outlet extending through substantially the entire length of its underside, circumferentially upwardly extending passages surrounding the central chamber connected to the outlet, of substantially constant section throughout the length of the heat exchanger, an exhaust connected to the upper end of the passages and, unobstructed axially extending passages interleaved between the central chamber and the circumferentially extending passages and out of communication with them, an engine driven fan for delivering air to be heated through the axially extending passages, a discharge opening for the heated air, and a fuel tank for the heater.

2. A unit as claimed in claim 1 mounted on wheels.

3. A unit as claimed in claim 1 mounted on a lorry, the lorry having an engine for propelling the lorry and for driving at least one of the group consisting of the fan and a pump for the fuel.

4. A unit as claimed in claim 1 including a flexible pipe connected to the discharge opening and a nozzle connected to the pipe.

5. A unit as claimed in claim 4 including an outlet box mounted to be swiveled in relation to the heat exchanger, in which the nozzle is in the form of a long slot in the box.

6. A unit as claimed in claim 5 including a jib mounted for supporting and moving the duct and nozzle.

7. A heat treating process using a hot air generating unit as claimed in claim 1.

8. A method of deicing or defrosting aircraft surfaces using a hot air generating unit as claimed in claim 1.

9. The use of a hot air generating unit as claimed in claim 1 for heating the air in a work area.